United States Patent
Kang et al.

(10) Patent No.: US 11,747,922 B2
(45) Date of Patent: Sep. 5, 2023

(54) INPUT DEVICE DRIVING METHOD AND INTERFACE DEVICE USING THE SAME

(71) Applicant: Samsung Display Co., Ltd., Yongin-si (KR)

(72) Inventors: Jina Kang, Hwaseong-si (KR); Soongyu Lee, Seoul (KR); Byeongkyu Jeon, Busan (KR); Kyowon Ku, Seoul (KR); Jinwoo Kim, Hwaseong-si (KR); Dongchun Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 17/447,774

(22) Filed: Sep. 15, 2021

(65) Prior Publication Data

US 2022/0129089 A1 Apr. 28, 2022

(30) Foreign Application Priority Data

Oct. 22, 2020 (KR) .......................... 10-2020-0137687

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/03547* (2013.01);
(Continued)

(58) Field of Classification Search
CPC ............. G06F 3/03545; G06F 3/03547; G06F 3/0383; G06F 3/0412; G06F 3/0416; G06F 3/04162; G06F 3/04182; G06F 3/0441; G06F 3/0442; G06F 3/0446; G06F 2203/0384; G06F 2203/04106; G09G 2330/06; G09G 2354/00

See application file for complete search history.

(56) References Cited

U.S. PATENT DOCUMENTS 10,185,413 B2  1/2019  Bakken et al.
10,241,597 B2  3/2019  Jung et al.
(Continued)

FOREIGN PATENT DOCUMENTS

KR  10-2017-0052815 A  5/2017
KR  10-2017-0090968 A  8/2017
KR  10-2018-0046338 A  5/2018

*Primary Examiner* — Julie Anne Watko
(74) *Attorney, Agent, or Firm* — Lewis Roca Rothgerber Christie LLP

(57) ABSTRACT

An interface device includes an electronic device and an input device for communicating with the electronic device. The electronic device includes a display layer, a sensor layer, and a controller for outputting a first uplink signal and a second uplink signal to the sensor layer. The input device includes a communication unit for receiving an uplink signal from the sensor layer, a memory for storing first information and second information, a signal determination unit for determining whether the uplink signal is the first uplink signal or the second uplink signal, based on the first information and the second information, and a signal conversion unit for outputting conversion data in response to the uplink signal being the second uplink signal.

20 Claims, 17 Drawing Sheets

(51) Int. Cl.
*G06F 3/044* (2006.01)
*G06F 3/041* (2006.01)

(52) U.S. Cl.
CPC .......... *G06F 3/0416* (2013.01); *G06F 3/0442* (2019.05); *G06F 3/04162* (2019.05); *G06F 3/0412* (2013.01); *G06F 3/0446* (2019.05); *G06F 2203/0384* (2013.01); *G06F 2203/04106* (2013.01); *G09G 2330/06* (2013.01); *G09G 2354/00* (2013.01)

(56) References Cited

U.S. PATENT DOCUMENTS

| | | | |
|---|---|---|---|
| 10,474,286 B2 | 11/2019 | Bae et al. | |
| 2015/0193025 A1* | 7/2015 | Rebeschi | G06F 3/03545 |
| | | | 345/174 |

* cited by examiner

INPUT DEVICE DRIVING METHOD AND INTERFACE DEVICE USING THE SAME

CROSS-REFERENCE TO RELATED APPLICATION

The present application claims priority to and the benefit of Korean Patent Application No. 10-2020-0137687 filed on Oct. 22, 2020, in the Korean Intellectual Property Office, the disclosures of which are incorporated by reference herein in their entireties.

BACKGROUND

Aspects of some embodiments of the present disclosure described herein relate to a method of driving an input device with relatively improved detection reliability and an interface device using the same.

An electronic device may detect an external input applied from the outside of the electronic device. The external input may be a user input. The user input may include various types of external inputs such as a portion of the user's body, light, heat, pens, pressure, or the like. The electronic device may recognize the coordinates of a pen using an electro-magnetic resonance (EMR) scheme or may recognize the coordinates of the pen using an active electrostatic (AES) scheme.

The above information disclosed in this Background section is only for enhancement of understanding of the background and therefore the information discussed in this Background section does not necessarily constitute prior art.

SUMMARY

Aspects of some embodiments of the present disclosure include a method of driving an input device with the improved detection reliability and an interface device using the same.

According to some embodiments, an interface device includes an electronic device and an input device for communicating with the electronic device. The electronic device includes a display layer, a sensor layer on the display layer and for detecting a first input by the input device, and a controller for outputting a first uplink signal and a second uplink signal having a phase different from a phase of the first uplink signal to the sensor layer. The input device includes a communication unit for receiving an uplink signal from the sensor layer, a memory for storing first information of the first uplink signal and second information of the second uplink signal, a signal determination unit for determining whether the uplink signal is the first uplink signal or the second uplink signal, based on the first information and the second information, and a signal conversion unit for outputting conversion data by converting the second uplink signal when the uplink signal is the second uplink signal.

According to some embodiments, the first uplink signal may include first synchronization data, first information data, and first verification data, and the second uplink signal may include second synchronization data, second information data, and second verification data.

According to some embodiments, the signal determination unit may distinguish the first uplink signal and the second uplink signal based on the first synchronization data or the second synchronization data, the first information stored in the memory, and the second information stored in the memory.

According to some embodiments, the signal determination unit may distinguish the first uplink signal and the second uplink signal based on the first information data or the second information data, the first information stored in the memory, and the second information stored in the memory.

According to some embodiments, the signal conversion unit may convert a first bit of the second uplink signal into a second bit different from the first bit and may convert the second bit into the first bit to output the conversion data.

According to some embodiments, the input device may output a downlink signal based on the conversion data or the first uplink signal.

According to some embodiments, the display layer may display an image during a plurality of frame sections. The controller may output the first uplink signal to the sensor layer during a n-th frame section ('n' is a positive integer), and the controller may output the second uplink signal to the sensor layer during a (n+1)-th frame section.

According to some embodiments, a first area and a second area adjacent to the first area may be defined on the sensor layer, and the controller may output the first uplink signal to the first area and may output the second uplink signal to the second area.

According to some embodiments, the electronic device may further include a display driver for generating a vertical synchronization signal for driving the display layer, and the controller may output the first uplink signal or the second uplink signal to the sensor layer in synchronization with the vertical synchronization signal.

According to some embodiments, the sensor layer may operate in a first mode for detecting the first input and a second mode for detecting a second input by a touch, and the controller may sequentially operate in the first mode and the second mode while an image during a single frame section is displayed on the display layer.

According to some embodiments, the input device may further include a noise determination unit for determining a noise signal different from the first uplink signal and the second uplink signal.

According to some embodiments, the noise determination unit may ignore the noise signal when the noise determination unit determines that the uplink signal is the noise signal.

According to some embodiments, a method of driving an input device includes receiving an uplink signal, determining whether the uplink signal is a first uplink signal or a second uplink signal having a phase different from a phase of the first uplink signal, and when the uplink signal is the second uplink signal, outputting conversion data by converting the second uplink signal.

According to some embodiments, the first uplink signal may include first synchronization data, first information data, and first verification data. The second uplink signal may include second synchronization data, second information data, and second verification data. The determining of whether the uplink signal is the first uplink signal or the second uplink signal may include distinguishing the first uplink signal and the second uplink signal based on the first synchronization data and the second synchronization data.

According to some embodiments, the converting of the second uplink signal may include converting a first bit of the second uplink signal into a second bit different from the first bit and converting the second bit into the first bit to output the conversion data.

According to some embodiments, the method may further include outputting a downlink signal based on the conversion data or the first uplink signal.

According to some embodiments, the first uplink signal may include first synchronization data, first information data, and first verification data. The second uplink signal may include second synchronization data, second information data, and second verification data. The determining of whether the uplink signal is the first uplink signal or the second uplink signal may include distinguishing the first uplink signal and the second uplink signal based on the first information data and the second information data.

According to some embodiments, the method may further include further determining a noise signal different from the first uplink signal and the second uplink signal and ignoring the noise signal when the input device receives the noise signal.

According to some embodiments, the determining of the noise signal may proceed simultaneously with the determining of whether the uplink signal is the first uplink signal or the second uplink signal.

According to some embodiments, the determining of the noise signal may proceed after the converting of the second uplink signal.

BRIEF DESCRIPTION OF THE FIGURES

The above and other aspects and characteristics of some embodiments of the present disclosure will become apparent by describing in more detail aspects of some embodiments thereof with reference to the accompanying drawings.

DETAILED DESCRIPTION

Figure 1A:
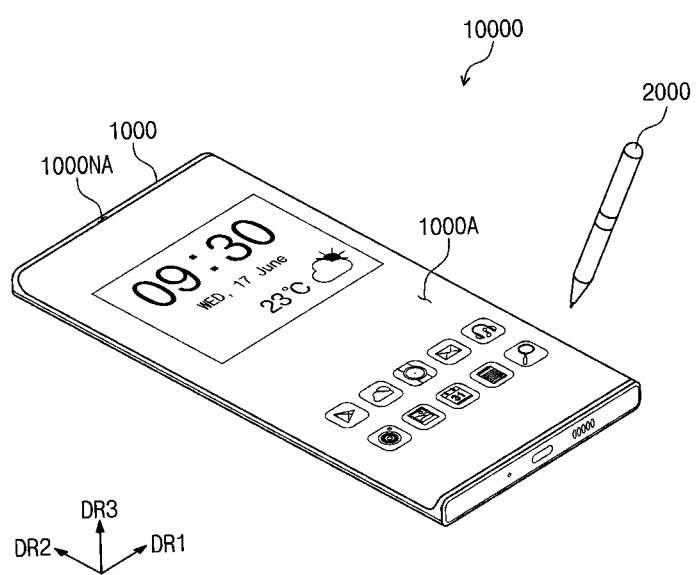
FIGS. 1A and B are perspective views illustrating an interface device according to some embodiments of the present disclosure.

In this specification, when a component (or area, layer, portion, or the like) is described as being "on", "connected to", or "coupled to" another component, it means that the component may be directly positioned/connected/coupled on the other component or a third component may be interposed between them.

The same reference numerals refer to like components. Also, in drawings, thicknesses, proportions, and dimensions of components may be exaggerated to describe the technical features effectively.

The expression "and/or" includes all combinations of one or more of the associated listed items.

Although the terms "first", "second", etc. may be used herein in reference to various components, such components should not be construed as being limited by these terms. These terms are only used to distinguish one element from the other. For example, without departing from the scope of the present disclosure, a first element may be referred to as a second element, and similarly, a second element may be referred to as a first element. The articles "a," "an," and "the" are singular in that they have a single referent, however, the use of the singular form in the present document should not preclude the presence of more than one referent.

Furthermore, terms such as "below", "to the lower side", "over", "to the upper side", and the like are used to describe the relationship between configurations illustrated in the drawings. The terms are relative concepts and are described based on the direction indicated in the drawings.

Unless otherwise defined, all terms (including technical terms and scientific terms) used in this specification have the same meaning as commonly understood by those skilled in the art to which this present disclosure belongs. Furthermore, terms such as terms defined in commonly used dictionaries should be interpreted as having a meaning consistent with the meaning in the context of the related technology, and may be explicitly defined herein unless interpreted in ideal or overly formal meanings.

It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, aspects of some embodiments of the present disclosure will be described with reference to accompanying drawings.

FIG. 1A is a perspective view illustrating an interface device according to some embodiments of the present disclosure.

Referring to FIG. 1A, an interface device 10000 may include an electronic device 1000 and an input device 2000. The electronic device 1000 may detect a first input by the input device 2000. The interface device 10000 may also be referred to as a "digitizer".

The electronic device 1000 may be a device activated based on an electrical signal. For example, the electronic device 1000 may be a mobile phone, a tablet, a car navigation system, a game machine, or a wearable device, but is not limited thereto. In FIG. 1A, the electronic device 1000 is illustrated as being a mobile phone, but embodiments according to the present disclosure are not limited thereto.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may be adjacent to the active area 1000A. The peripheral area 1000NA may surround the peripheral area of the active area 1000A.

The thickness direction of the electronic device 1000 may be parallel to a third direction DR3 intersected with the first direction DR1 and the second direction DR2. Accordingly, the front surfaces (or upper surfaces) and the bottom surfaces (or lower surfaces) of the members constituting the electronic device 1000 may be defined based on the third direction DR3.

The electronic device 1000 may detect inputs applied from the outside of the electronic device 1000. The inputs applied from the outside may include various types of external inputs such as a portion of a user's body, light, heat, pressure, or the like. The inputs applied from the outside may be referred to as a "second input".

The electronic device 1000 illustrated in FIG. 1A may detect an input by the user's touch and an input by the input device 2000. The input device 2000 may refer to a device other than the user's body. The input by the input device 2000 may be referred to as a "first input". For example, the input device 2000 may be an active pen, a stylus pen, a touch pen, or an electronic pen. Hereinafter, the input device 2000 is illustrated as an active pen, but embodiments are not limited thereto.

The electronic device 1000 and the input device 2000 may be capable of bidirectional communication. The electronic device 1000 may provide an uplink signal to the input device 2000. For example, the uplink signal may include synchronization data or information of the electronic device 1000, but embodiments according to the present disclosure are not particularly limited thereto. The input device 2000 may provide a downlink signal to the electronic device 1000. The downlink signal may include state information of the input device 2000 or synchronization data. For example, the downlink signal may include the coordinate information of the input device 2000, the battery information of the input device 2000, the slope information of the input device 2000, and/or the various pieces of information stored in the input device 2000, but embodiments according to the present disclosure are not particularly limited thereto. The uplink signal and the downlink signal will be described in more detail later.

Figure 1B:
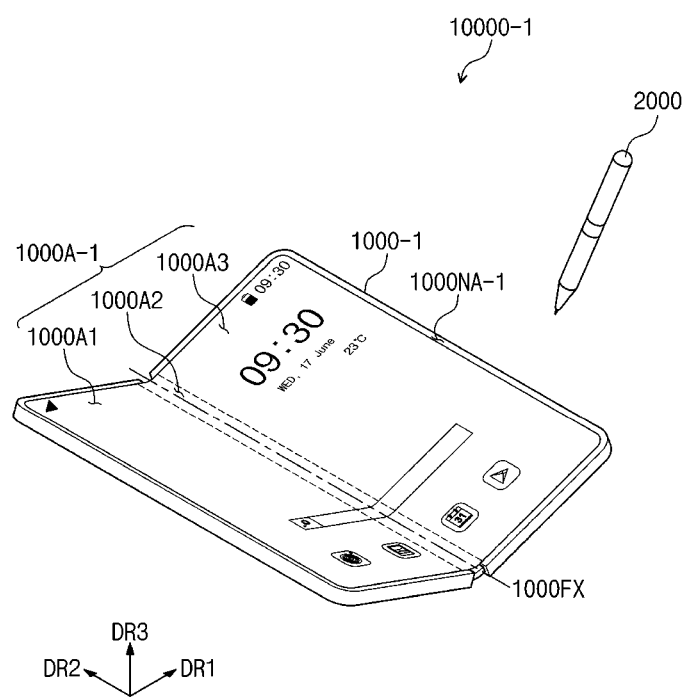

FIG. 1B is a perspective view illustrating an interface device according to some embodiments of the present disclosure. In the description of FIG. 1B, the same reference numerals are assigned to the same components described through FIG. 1A, and the descriptions thereof are omitted.

Referring to FIG. 1B, an interface device 10000-1 may include an electronic device 1000-1 and the input device 2000. In FIG. 1B, it is illustrated that the electronic device 1000-1 is folded at an angle (e.g., a set or predetermined angle). An active area 1000A-1 may include a plane defined by a first direction DR1 and a second direction DR2, in a state where the electronic device 1000-1 is unfolded.

The active area 1000A-1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent with respect to a folding axis 1000FX extending along the second direction DR2. Accordingly, the first area 1000A1 and the third area 1000A3 may be referred to as "non-folding areas"; the second area 1000A2 may be referred to as a "folding area".

When the electronic device 1000-1 is folded, the first area 1000A1 and the third area 1000A3 may face each other. Accordingly, in a state where the electronic device 1000-1 is fully folded, the active area 1000A-1 may not be exposed to the outside, which may be referred to as "in-folding". However, embodiments are not limited thereto and the operation of the electronic device 1000-1 is not limited thereto.

For example, when the electronic device 1000-1 according to some embodiments of the present disclosure is folded, the first area 1000A1 and the third area 1000A3 may be opposed to each other. Accordingly, in a state where the electronic device 1000-1 is folded, the active area 1000A-1 may be exposed to the outside, which may be referred to as "out-folding".

The electronic device 1000-1 may perform only one operation of an in-folding operation or an out-folding operation. Alternatively, the electronic device 1000-1 may perform both an in-folding operation and an out-folding operation. In this case, the same area of the electronic device 1000-1, for example, the second area 1000A2 may be in-folded and out-folded.

One folding area and two non-folding areas are illustrated in FIG. 1B, but the number of folding areas and the number of non-folding areas are not limited thereto. For example, the electronic device 1000-1 may include a plurality of non-folding areas, of which the number is greater than two, and a plurality of folding areas interposed between non-folding areas adjacent to one another.

In FIG. 1B, the folding axis 1000FX is illustrated as extending in the second direction DR2, but embodiments according to the present disclosure are not limited thereto. For example, the folding axis 1000FX may extend along a direction parallel to the first direction DR1. In this case, the first area 1000A1, the second area 1000A2, and the third area 1000A3 may be sequentially arranged along the second direction DR2.

The electronic device 1000-1 and the input device 2000 may be capable of bidirectional communication. The electronic device 1000-1 may provide an uplink signal to the input device 2000. The input device 2000 may provide a downlink signal to the electronic device 1000-1. The electronic device 1000-1 may detect the coordinates or slope of the input device 2000, using the signal provided from the input device 2000.

Figure 2:
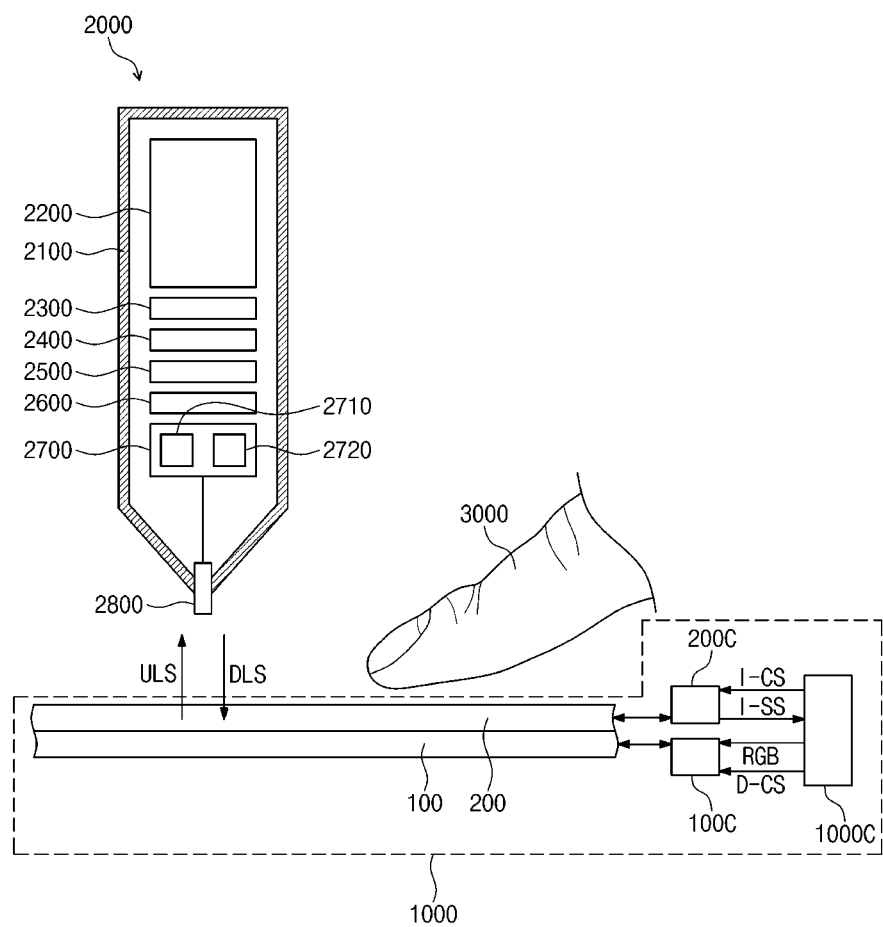
FIG. 2 is a block diagram schematically illustrating an electronic device and an input device according to some embodiments of the present disclosure.

FIG. 2 is a block diagram schematically illustrating an electronic device and an input device according to some embodiments of the present disclosure.

Referring to FIG. 2, the electronic device 1000 may include a display layer 100, a sensor layer 200, a display driver 100C, a controller 200C, and a main controller 1000C.

The display layer 100 may be a configuration that substantially generates an image. The display layer 100 may be an emissive display layer. For example, the display layer 100 may be an organic light emitting display layer, a quantum dot display layer, a micro-LED display layer, or a nano-LED display layer.

The sensor layer 200 may be located on the display layer 100. The sensor layer 200 may detect an external input applied from the outside. The sensor layer 200 may detect a first input by the input device 2000 and a second input by a user's body 3000.

The main controller 1000C may control the overall operation of the electronic device 1000. For example, the main controller 1000C may control the operations of the display driver 100C and the controller 200C. The main controller 1000C may include at least one microprocessor, and the main controller 1000C may be referred to as a host.

The display driver 100C may control the display layer 100. The main controller 1000C may further include a graphic controller. The display driver 100C may receive image data RGB and a control signal D-CS from the main controller 1000C. The control signal D-CS may include various signals. For example, the control signal D-CS may include an input vertical synchronization signal, an input horizontal synchronization signal, a main clock, and a data enable signal. The display driver 100C may generate a vertical synchronization signal and a horizontal synchronization signal for controlling timing for providing a signal to the display layer 100, based on the control signal D-CS.

The controller 200C may control the sensor layer 200. The controller 200C may receive a control signal I-CS from the main controller 1000C. The control signal I-CS may include a mode determination signal and a clock signal for determining the driving mode of the controller 200C. Based on the control signal I-CS, the controller 200C may operate in a first mode, in which a first input by the input device 2000 is detected, or a second mode in which a second input by the user's body 3000 is detected. The controller 200C may control the sensor layer 200 in the first mode or the second mode based on the mode determination signal.

The controller 200C may calculate coordinate information of a first input or a second input based on a signal received from the sensor layer 200 and may provide a coordinate signal I-SS having the coordinate information to the main controller 1000C. The main controller 1000C may execute an operation corresponding to a user input based on the coordinate signal I-SS. For example, the main controller 1000C may operate the display driver 100C such that a new application image is displayed on the display layer 100 based on the coordinate signal I-SS.

The input device 2000 may include housing 2100, a power supply 2200, a memory 2300, a signal determination unit 2400, a signal conversion unit 2500, a noise determination unit 2600, a communication unit 2700, and a pen electrode 2800. However, the components constituting the input device 2000 are not limited by the listed components. For example, the input device 2000 may further include an electrode switch for switching to a signal transmission mode or a signal reception mode, a pressure sensor for sensing pressure, or a rotation sensor for sensing rotation.

The housing 2100 may have a pen shape. An accommodation space may be formed inside the housing 2100. The power supply 2200, the memory 2300, the signal determination unit 2400, the signal conversion unit 2500, the noise determination unit 2600, the communication unit 2700, and the pen electrode 2800 may be accommodated in the accommodation space defined inside the housing 2100.

The power supply 2200 may supply power to the memory 2300, the signal determination unit 2400, the signal conversion unit 2500, the noise determination unit 2600, the communication unit 2700, and the like inside the input device 2000. The power supply 2200 may include a battery or a high capacity capacitor.

The memory 2300 may store information about an uplink signal ULS.

The signal determination unit 2400 may distinguish the uplink signal ULS received from the sensor layer 200, based on the information stored in the memory 2300.

The signal conversion unit 2500 may convert the uplink signal ULS distinguished by the signal determination unit 2400.

The noise determination unit 2600 may determine a noise signal different from the uplink signal ULS received from the sensor layer 200. The signal determination unit 2400, the signal conversion unit 2500, and the noise determination unit 2600 will be described later.

The communication unit 2700 may include a transmission circuit 2710 and a reception circuit 2720. The transmission circuit 2710 may output a downlink signal DLS to the sensor layer 200. The reception circuit 2720 may receive the uplink signal ULS provided from the sensor layer 200. The uplink signal ULS may have the frequency of 500 kilohertz (kHz). The uplink signal ULS may include a first uplink signal ULS1 (see FIG. 9) and a second uplink signal ULS2 (see FIG. 9). The first uplink signal ULS1 (see FIG. 9) and the second uplink signal ULS2 (see FIG. 9) will be described later.

The pen electrode 2800 may be electrically connected to the communication unit 2700. A portion of the pen electrode 2800 may protrude from the housing 2100. Alternatively, the input device 2000 may further include a cover housing that covers the pen electrode 2800 exposed from the housing 2100. Alternatively, the pen electrode 2800 may be embedded in the housing 2100. The pen electrode 2800 may include a first pen electrode for sensing the coordinates of the input device 2000 and a second pen electrode for sensing the slope of the input device 2000.

Figure 3A:
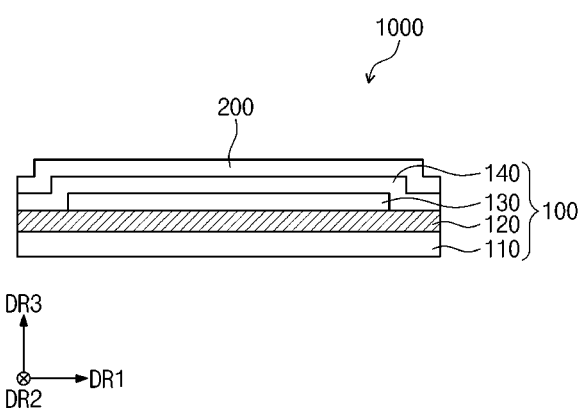
FIGS. 3A and 3B are cross-sectional views of an electronic device according to some embodiments of the present disclosure.

FIG. 3A is a cross-sectional view of an electronic device according to some embodiments of the present disclosure.

Referring to FIG. 3A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, embodiments according to the present disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a "base barrier layer".

Each of the first and second synthetic resin layers may include polyimide-based resin. In addition, each of the first and second synthetic resin layers may include at least one of acrylic-based resin, methacrylate-based resin, polyisoprene-based resin, vinyl-based resin, epoxy-based resin, urethane-based resin, cellulose-based resin, siloxane-based resin, polyamide-based resin, or perylene-based resin. In the meantime, "~~"-based resin in the specification means including the functional group of "~~".

The circuit layer 120 may be located on the base layer 110. The circuit layer 120 may include an insulating layer, a semiconductor pattern, a conductive pattern, a signal line, and the like. The insulating layer, the semiconductor layer, and the conductive layer may be formed on the base layer 110 in the scheme such as coating, evaporation, or the like. Afterward, the insulating layer, the semiconductor layer, and the conductive layer may be selectively patterned by performing a photolithography process a plurality of times. Afterward, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be located on the light emitting element layer 130. The encapsulation layer 140 may protect the light emitting element layer 130 from foreign objects such as moisture, oxygen, and dust particles.

The sensor layer 200 may be formed on the display layer 100 through continuous processes. In this case, the sensor layer 200 may be expressed as being directly located on the display layer 100. "Being directly located" may mean that the third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a common adhesive or a common sticking agent.

Figure 3B:
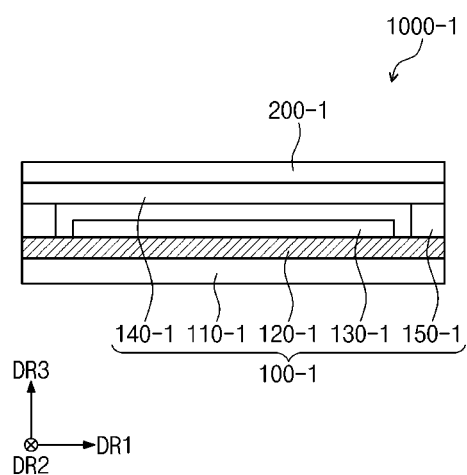

FIG. 3B is a cross-sectional view of an electronic device according to some embodiments of the present disclosure.

Referring to FIG. 3B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, or a polymer substrate, but embodiments according to the present disclosure are not particularly limited thereto. For example, the base substrate 110-1 and the encapsulation substrate 140-

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not limited to the example.

The sensor layer 200-1 may be directly located on the encapsulation substrate 140-1. "Being directly located" may mean that the third component is not interposed between the sensor layer 200-1 and the encapsulation substrate 140-1 That is, a separate adhesive member may not be interposed between the sensor layer 200-1 and the display layer 100-1. However, embodiments according to the present disclosure are not limited thereto, and an adhesive layer may be further interposed between the sensor layer 200-1 and the encapsulation substrate 140-1.

Figure 4:
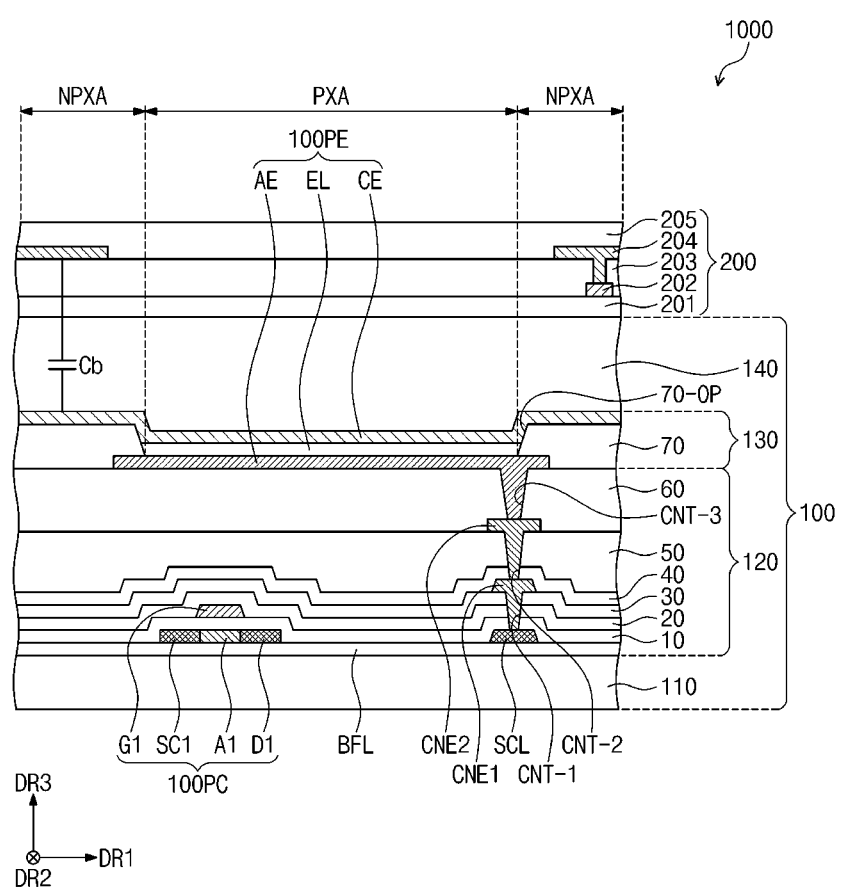
FIG. 4 is a cross-sectional view of an electronic device according to some embodiments of the present disclosure.

FIG. 4 is a cross-sectional view of an electronic device according to some embodiments of the present disclosure. In the description of FIG. 4, the same reference numerals are assigned to the same components described through FIG. 3A, and the descriptions thereof are omitted.

Referring to FIG. 4, at least one inorganic layer may be formed on the upper surface of the base layer 110. The inorganic layer may include at least one of aluminum oxide, titanium oxide, silicon oxide, silicon oxynitride, zirconium oxide, or hafnium oxide. The inorganic layer may be formed in multi layers. The multi-layered inorganic layers may constitute a barrier layer and/or a buffer layer. According to some embodiments, the display layer 100 may include a buffer layer BFL.

The buffer layer BFL may improve the bonding strength between the base layer 110 and the semiconductor pattern. The buffer layer BFL may include a silicon oxide layer and a silicon nitride layer, and the silicon oxide layer and the silicon nitride layer may be stacked alternately.

The semiconductor pattern may be located on the buffer layer BFL. The semiconductor pattern may include polysilicon. However, the embodiments according to the present disclosure are not limited thereto, and the semiconductor pattern may include amorphous silicon, low-temperature polycrystalline silicon, or an oxide semiconductor.

FIG. 4 only illustrates some semiconductor patterns, and semiconductor patterns may be further located in another area. The semiconductor pattern may be arranged in a specific arrangement or pattern throughout the pixels. The semiconductor pattern may have different electrical characteristics depending on whether the semiconductor pattern is doped. The semiconductor pattern may include a first area having a relatively high conductivity and a second area having a relatively low conductivity. The first area may be doped with an N-type dopant or a P-type dopant. The P-type transistor may include the doped area doped with a P-type dopant, and the N-type transistor may include the doped area doped with an N-type dopant. The second area may be an undoped area or may be doped with a lower concentration than the first area.

The conductivity of the first area is greater than that of the second area. The first area may substantially operate as an electrode or signal line. The second area may substantially correspond to the active (or channel) of a transistor. In other words, a part of the semiconductor pattern may be the active of the transistor. Another part thereof may be the source or drain of the transistor. Still another part may be a connection electrode or a connection signal line.

Each of the pixels may have an equivalent circuit including seven transistors, one capacitor, and a light emitting element. The equivalent circuit of a pixel may be modified in various shapes. A single transistor 100PC and a light emitting element 100PE included in a pixel are illustrated in FIG. 4.

The transistor 100PC may include a source SC1, an active A1, a drain D1, and a gate G1. The source SC1, the active A1, and the drain D1 may be formed from the semiconductor pattern. The source SC1 and the drain D1 may extend in directions opposite to each other from the active A1 on a cross section. A part of a connection signal line SCL formed from the semiconductor pattern is illustrated in FIG. 4. According to some embodiments, the connection signal line SCL may be electrically connected to the drain D1 of the transistor 100PC on a plane.

A first insulating layer 10 may be located on the buffer layer BFL. The first insulating layer 10 may overlap with a plurality of pixels in common and may cover the semiconductor pattern. The first insulating layer 10 may be an inorganic layer and/or an organic layer, and may have a single layer or multi-layer structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single-layered silicon oxide layer. Not only the first insulating layer 10 but also the insulating layer of the circuit layer 120 to be described later may be an inorganic layer and/or an organic layer, and may have a single layer or multi-layer structure. The inorganic layer may include at least one of the above-described materials, but embodiments according to the present disclosure are not limited thereto.

The gate G1 is located on the first insulating layer 10. The gate G1 may be a part of a metal pattern. The gate G1 overlaps with the active A1. In a process of doping the semiconductor pattern, the gate G1 may function as a mask.

A second insulating layer 20 is located on the first insulating layer 10 and may cover the gate G1. The second insulating layer 20 may overlap with pixels in common. The second insulating layer 20 may be an inorganic layer and/or an organic layer, and may have a single layer or multi-layer structure. The second insulating layer may include at least one of silicon oxide, silicon nitride, or silicon oxynitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single layer or multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to a connection signal line SCL through a contact hole CNT-1 penetrating the first, second, and third insulating layers 10, 20, and 30.

A fourth insulating layer 40 may be located on the third insulating layer 30. The fourth insulating layer 40 may be a silicon oxide layer having a single layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, the light emitting element 100PE is illustrated as being an organic light-emitting device, but embodiments according to the present disclosure are not particularly limited thereto.

The light emitting element 100PE may include a first electrode AE, a light emitting layer EL, and a second electrode CE. The first electrode AE may be located on the sixth insulating layer 60. The first electrode AE may be connected to the second connection electrode CNE2 through a contact hole CNT-3 penetrating the sixth insulating layer 60.

A pixel defining film 70 may be located on the sixth insulating layer 60 and may cover a part of the first electrode AE. An opening 70-OP is defined in the pixel defining film 70. The opening 70-OP of the pixel defining film 70 exposes at least part of the first electrode AE.

The active area 1000A (see FIG. 1A) may include a light-emitting area PXA and a non-light-emitting area NPXA adjacent to the light-emitting area PXA. The non-light-emitting area NPXA may surround the light-emitting area PXA. In this embodiment, the light-emitting area PXA is defined to correspond to the partial area of the first electrode AE exposed by the opening 70-OP.

The light emitting layer EL may be located on the first electrode AE. The light emitting layer EL may be located in an area corresponding to the opening 70-OP. That is, the light emitting layer EL may be formed separately on each of pixels. When the light emitting layer EL is separately formed on each of the pixels, each of the light emitting layers EL may emit light of at least one color of blue, red, and green. However, embodiments according to the present disclosure are not limited thereto, and the light emitting layer EL may be connected and provided to the pixels in common. In this case, the light emitting layer EL may provide blue light or white light.

The second electrode CE may be located on the light emitting layer EL. The second electrode CE may be located in a plurality of pixels in common while having an integral shape.

According to some embodiments, a hole control layer may be interposed between the first electrode AE and the light emitting layer EL. The hole control layer may be located in the light-emitting area PXA and the non-light-emitting area NPXA in common. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels, using an open mask.

The encapsulation layer 140 may be located on the light emitting element layer 130. The encapsulation layer 140 may include an inorganic layer, an organic layer, and an inorganic layer, which are sequentially stacked, but the layers constituting the encapsulation layer 140 are not limited thereto.

The inorganic layers may protect the light emitting element layer 130 from moisture and oxygen; the organic layer may protect the light emitting element layer 130 from foreign objects such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but is not limited thereto.

The sensor layer 200 may be formed on the display layer 100 through continuous processes. In this case, the sensor layer 200 may be expressed as being directly located on the display layer 100. "Being directly located" may mean that the third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a common adhesive or a common sticking agent.

The sensor layer 200 may include a base insulating layer 201, a first conductive layer 202, a detection insulating layer 203, a second conductive layer 204, and a cover insulating layer 205.

The base insulating layer 201 may be an inorganic layer including at least one of silicon nitride, silicon oxynitride, or silicon oxide. Alternatively, the base insulating layer 201 may be an organic layer including an epoxy resin, an acrylic resin, or an imide-based resin. The base insulating layer 201 may have a single layer structure or may have a multi-layer structure stacked along the third direction DR3.

Each of the first conductive layer 202 and the second conductive layer 204 may have a single layer structure or may have a multi-layer structure stacked along the third direction DR3.

The conductive layer of a single layer structure may include a metal layer or a transparent conductive layer. The metal layer may include molybdenum, silver, titanium, copper, aluminum, or the alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as PEDOT, metal nano wires, graphene, and the like.

The conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

At least one of the detection insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the detection insulating layer 203 or the cover insulating layer 205 may include an organic film. The organic film may include at least one of acrylic-based resin, methacrylate-based resin, polyisoprene-based resin, vinyl-based resin, epoxy-based resin, urethane-based resin, cellulose-based resin, siloxane-based resin, polyimide-based resin, polyimide-based resin, or perylene-based resin.

Figure 5:
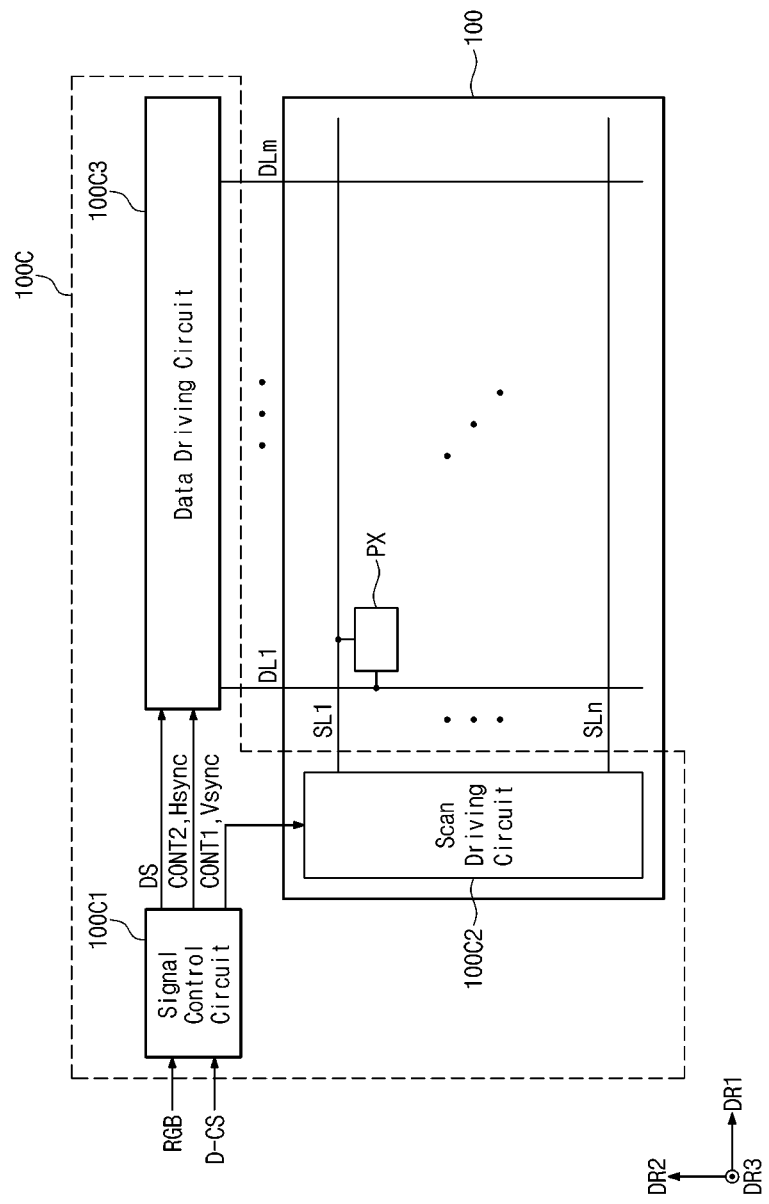
FIG. 5 is a block diagram of a display layer and a display driver according to some embodiments of the present disclosure.

FIG. 5 is a block diagram of a display layer and a display driver according to some embodiments of the present disclosure.

Referring to FIG. 5, the display layer 100 may include a plurality of scan wires SL1 to SLn, a plurality of data wires DL1 to DLm, and a plurality of pixels PX. Each of a plurality of pixels PX may be connected to a corresponding data wire among the plurality of data wires DL1-DLm, and may be connected to a corresponding scan wire among the plurality of scan wires SL1-SLn. According to some embodiments of the present disclosure, the display layer 100 may further include light-emitting control wires, and the display driver 100C may further include a light-emitting driving circuit that provides control signals to light-emitting control wires. The configuration of the display layer 100 is not particularly limited thereto.

The display driver 100C may include a signal control circuit 100C1, a scan driving circuit 100C2, and a data driving circuit 100C3.

The signal control circuit 100C1 may receive the image data RGB and the control signal D-CS from the main controller 1000C (see FIG. 2). The control signal D-CS may include various signals. For example, the control signal D-CS may include an input vertical synchronization signal, an input horizontal synchronization signal, a main clock, and a data enable signal.

The signal control circuit 100C1 may generate a first control signal CONT1 and a vertical synchronization signal Vsync, and may output the first control signal CONT1 and the vertical synchronization signal Vsync to the scan driving circuit 100C2, based on the control signal D-CS. The vertical synchronization signal Vsync may be included in the first control signal CONT1.

The signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C3. The horizontal synchronization signal Hsync may be included in the second control signal CONT2.

Furthermore, the signal control circuit 100C1 may output, to the data driving circuit 100C3, a data signal DS obtained by processing the image data RGB to be suitable for an operating condition of the display layer 100. The first control signal CONT1 and the second control signal CONT2 are signals necessary for the operation of the scan driving circuit 100C2 and the data driving circuit 100C3 and are not particularly limited thereto.

The scan driving circuit 100C2 may drive the plurality of scan wires SL1-SLn in response to the first control signal CONT1 and the vertical synchronization signal Vsync. According to some embodiments of the present disclosure, the scan driving circuit 100C2 may be formed in the same process as the circuit layer 120 (see FIG. 4) in the display layer 100, but embodiments according to the present disclosure are not limited thereto. For example, the scan driving circuit 100C2 may be implemented as an integrated circuit (IC). The scan driving circuit 100C2 may be directly mounted in an area (e.g., a set or predetermined area) of the display layer 100 or may be mounted on a separate printed circuit board in a chip on film (COF) scheme, and then may be electrically connected to the display layer 100.

The data driving circuit 100C3 may output grayscale voltages for driving the plurality of data wires DL1-DLm, in response to the second control signal CONT2, the horizontal synchronization signal Hsync, and the data signal DS from the signal control circuit 100C1. The data driving circuit 100C3 may be implemented with IC. The data driving circuit 100C3 may be directly mounted in an area (e.g., a set or predetermined area) of the display layer 100 or may be mounted on a separate printed circuit board in a COF scheme, and then may be electrically connected to the display layer 100, but is not particularly limited thereto. For example, the data driving circuit 100C3 may be formed in the same process as the circuit layer 120 (see FIG. 4) in the display layer 100.

Figure 6:
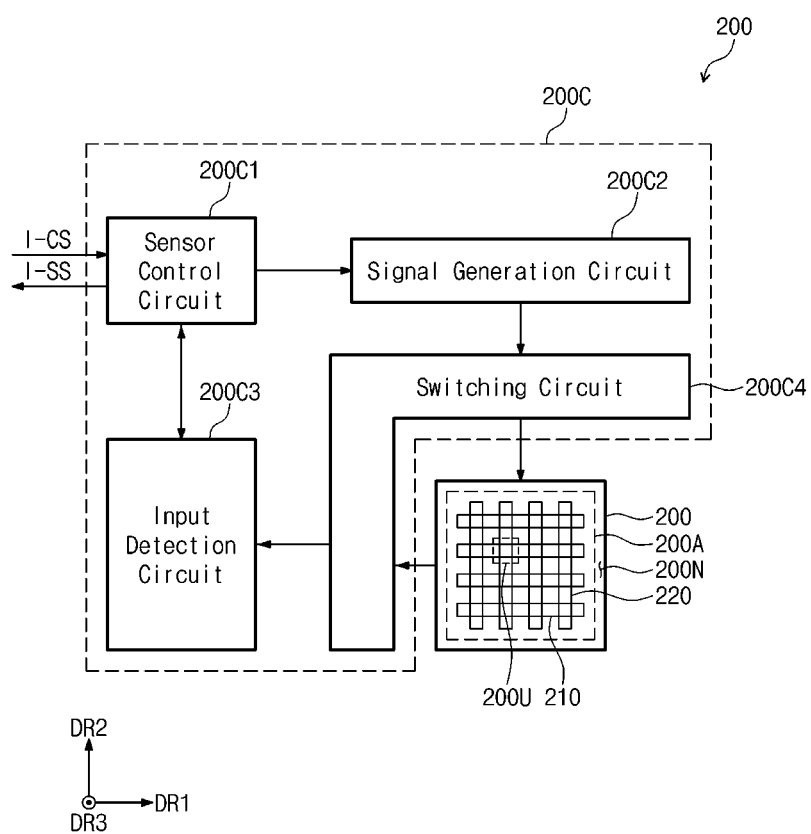
FIG. 6 is a block diagram of a sensor layer and a controller according to some embodiments of the present disclosure.

FIG. 6 is a block diagram of a sensor layer and a controller according to some embodiments of the present disclosure.

Referring to FIG. 6, an active area 200A and a peripheral area 200N may be defined in the sensor layer 200. The active area 200A may be an area activated depending on an electrical signal. For example, the active area 200A may be an area for sensing an input. The active area 200A may overlap with the active area 1000A (see FIG. 1A) of the electronic device 1000 (see FIG. 1A). The peripheral area 200N may surround the active area 200A. The peripheral area 200N may overlap with the peripheral area 1000NA (see FIG. 1A) of the electronic device 1000 (see FIG. 1A).

The sensor layer 200 may include a plurality of electrodes 210 and a plurality of cross electrodes 220. Each of the plurality of electrodes 210 may extend in the first direction DR1, and the plurality of electrodes 210 may be arranged spaced from one another in the second direction DR2. Each of the plurality of cross electrodes 220 may extend in the second direction DR2, and the plurality of cross electrodes 220 may be arranged spaced from one another in the first direction DR1.

The plurality of cross electrodes 220 may be intersected with the plurality of electrodes 210 in an insulation scheme. Each of the plurality of electrodes 210 and the plurality of cross electrodes 220 may have a bar shape or a stripe shape. The plurality of electrodes 210 and the plurality of cross electrodes 220 having such the shape may improve detection characteristics of a continuous linear input. However, the shape of each of the plurality of electrodes 210 and the plurality of cross electrodes 220 is not limited thereto.

The controller 200C may be electrically connected to the sensor layer 200. The controller 200C may control the sensor layer 200. The controller 200C may receive the control signal I-CS from the main controller 1000C (see FIG. 2) and may provide the coordinate signal I-SS to the main controller 1000C (see FIG. 2).

The controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip; alternatively, a part of the sensor control circuit 200C1, the signal generation circuit 200C2, and the input detection circuit 200C3, and another part thereof may be implemented in different chips.

The sensor control circuit 200C1 may control the operations of the signal generation circuit 200C2 and the switching circuit 200C4, may calculate the coordinates of the external input from the driving signal received from the input detection circuit 200C3 or analyze information transmitted by the input device 2000 (see FIG. 2) from the modulated signal received from the input detection circuit 200C3. The sensor control circuit 200C1 may provide the sensor layer 200 with a first uplink signal or a second uplink signal having a phase different from that of the first uplink signal. This will be described later.

The signal generation circuit 200C2 may provide the sensor layer 200 with an output signal (or a driving signal) referred to as a "TX signal". The signal generation circuit 200C2 may output an output signal matched with an operating mode to the sensor layer 200.

The input detection circuit 200C3 may convert an analog signal, which is referred to as an "RX signal (or a detection signal)" received from the sensor layer 200, into a digital signal. The input detection circuit 200C3 may amplify the received analog signal and then may filter the amplified analog signal. Afterward, the input detection circuit 200C3 may convert the filtered signal into a digital signal.

The switching circuit 200C4 may selectively control an electrical connection relationship among the sensor layer 200, the signal generation circuit 200C2, and/or the input detection circuit 200C3 under the control of the sensor control circuit 200C1.

The switching circuit 200C4 may connect each of the plurality of electrodes 210 and the plurality of cross electrodes 220 to the signal generation circuit 200C2. Alternatively, the switching circuit 200C4 may connect each of the plurality of electrodes 210 and the plurality of cross electrodes 220 to the input detection circuit 200C3. In this case, the sensor layer 200 may operate in a first mode.

Under the control of the sensor control circuit 200C1, the switching circuit 200C4 may connect any one group of the plurality of electrodes 210 and the plurality of cross electrodes 220 to the signal generation circuit 200C2, and may connect the remaining groups of the plurality of electrodes 210 and the plurality of cross electrodes 220 to the input detection circuit 200C3. In this case, the sensor layer 200 may operate in a second mode.

Figure 7A:
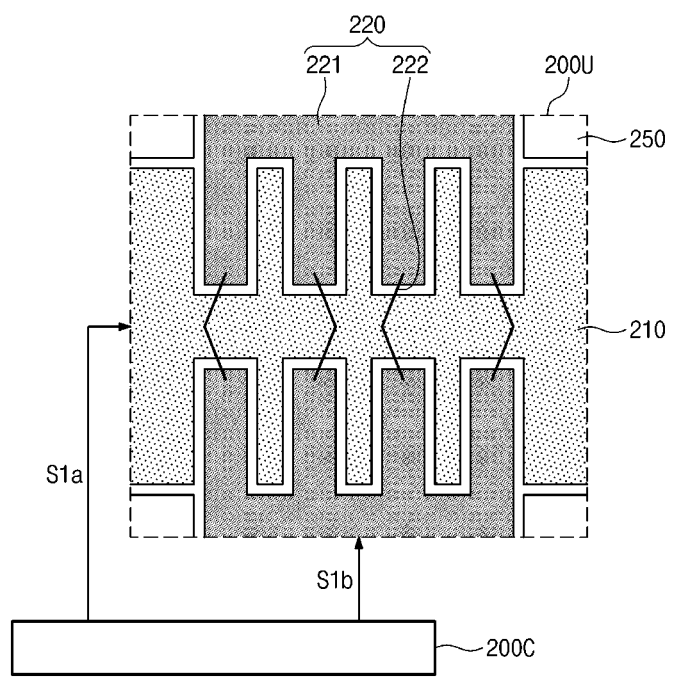
FIGS. 7A and 7B are diagrams illustrating a part of a sensor layer operating in a first mode according to some embodiments of the present disclosure.
Figure 7B:
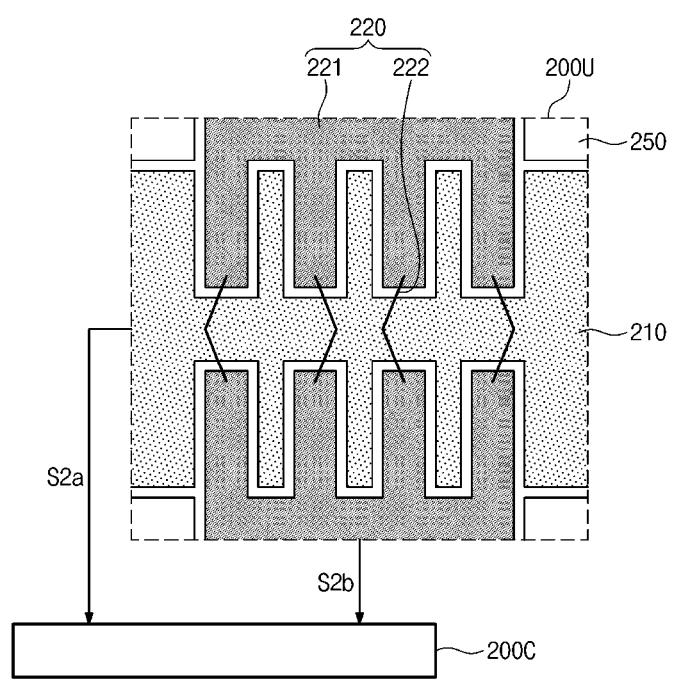

FIGS. 7A and 7B are diagrams illustrating a part of a sensor layer operating in a first mode according to some embodiments of the present disclosure.

Referring to FIGS. 6 to 7B, a part of one electrode 210 and a part of one cross electrode 220 may be defined as one sensing unit 200U. In each of FIGS. 7A and 7B, one sensing unit 200U is illustrated while being enlarged.

The cross electrode 220 may include cross patterns 221 and bridge patterns 222 electrically connected to the cross patterns 221. The cross patterns 221 may be spaced from one another with the electrode 210 interposed therebetween. The bridge patterns 222 may overlap with electrode 210, and the bridge patterns 222 may be intersected with the electrode 210 in an insulation scheme.

The cross patterns 221 and the electrode 210 may be placed on the same layer, and the bridge patterns 222 may be located on a layer different from the cross patterns 221 and the electrode 210. For example, the cross patterns 221 and the electrode 210 may be included in the second conductive layer 204 (see FIG. 4), and the bridge patterns 222 may be included in the first conductive layer 202 (see FIG. 4). This structure may be referred to as a "bottom bridge structure". However, the present disclosure is not particularly limited thereto. For example, the cross patterns 221 and the electrode 210 may be included in the first conductive layer 202 (see FIG. 4), and the bridge patterns 222 may be included in the second conductive layer 204 (see FIG. 4). This structure may be referred to as a "top bridge structure".

Besides, the sensor layer 200 may further include a dummy pattern 250 located in an area where a cross pattern 221 and the electrode 210 are not arranged. The dummy pattern 250 may be a configuration provided to prevent the electrode 210 and the cross electrode 220 from being visually recognized from the outside. The dummy pattern 250 may be an electrically-floating pattern.

Each of the cross patterns 221, the electrode 210, and the dummy pattern 250 may have a mesh structure. In this case, an opening may be defined in each of the cross patterns 221, the electrode 210, and the dummy pattern 250. However, the present disclosure is not limited thereto, and each of the cross pattern 221, the electrode 210, and the dummy pattern 250 may be formed of a transparent electrode that has no opening.

The first mode may be a mode in which the electronic device 1000 (see FIG. 1A) and the input device 2000 (see FIG. 1A) transmit and receive data to each other. In the first mode, the controller 200C may detect a first input by the input device 2000 (see FIG. 2). The operation illustrated in FIG. 7A may be an operation of providing an uplink signal from the electronic device 1000 (see FIG. 1A) to the input device 2000 (see FIG. 1A).

Referring to FIG. 7A, aspects of some embodiments are illustrated in which each of the electrode 210 and the cross electrode 220 may be used as a transfer electrode for providing the uplink signal S1a or S1b provided from the controller 200C to the input device 2000 (see FIG. 1A), but embodiments according to the present disclosure are not particularly limited thereto. For example, the electrode 210 or the cross electrode 220 may be utilized as the transfer electrode. The uplink signal S1*a* or S1*b* may be the uplink signal ULS of FIG. 2.

Referring to FIG. 7B, each of the electrode 210 and the cross electrode 220 may be used as reception electrodes for delivering detection signals S2*a* and S2*b* induced from the input device 2000 (see FIG. 1A) to the controller 200C. The controller 200C may receive the first detection signal S2*a* from the electrode 210 and may receive the second detection signal S2*b* from the cross electrode 220.

Figure 8:
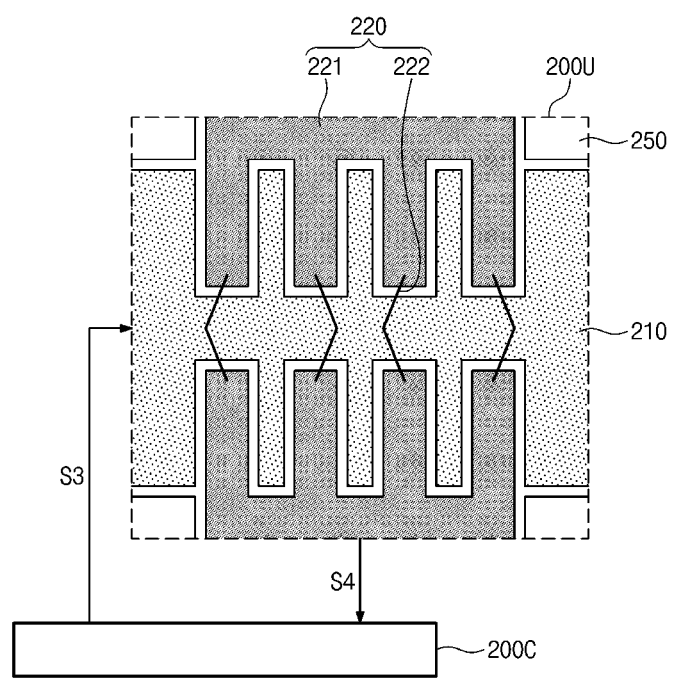
FIG. 8 is a diagram illustrating a sensor layer operating in a second mode according to some embodiments of the present disclosure.

FIG. 8 is a diagram illustrating a sensor layer operating in a second mode according to some embodiments of the present disclosure.

Referring to FIGS. 6 and 8, in a second mode, the controller 200C may detect a second input by the user's body 3000 (see FIG. 2). In the second mode, the controller 200C may detect an external input by detecting the variation in mutual capacitance formed between the electrode 210 and the cross electrode 220.

The controller 200C may provide an output signal S3 to the electrode 210, and the controller 200C may receive a detection signal S4 from the cross electrode 220. That is, in the second mode, the electrode 210 may function as a transmission electrode, and the cross electrode 220 may function as a reception electrode. However, embodiments according to the present disclosure are not particularly limited thereto. For example, the electrode 210 may function as the reception electrode and the cross electrode 220 may function as the transmission electrode.

Figure 9:
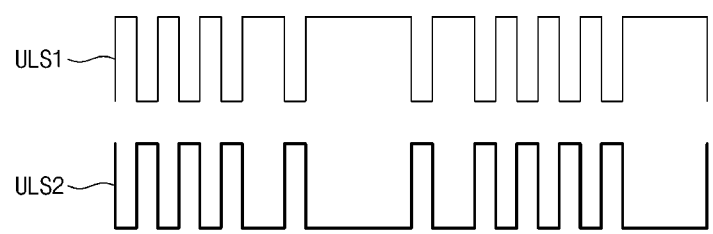
FIG. 9 illustrates a waveform of each of a first uplink signal and a second uplink signal according to some embodiments of the present disclosure.

FIG. 9 illustrates a waveform of each of a first uplink signal and a second uplink signal according to some embodiments of the present disclosure.

Referring to FIG. 9, the controller 200C may output the first uplink signal ULS1 or the second uplink signal ULS2 to the sensor layer 200. The first uplink signal ULS1 and the second uplink signal ULS2 may have different phases from each other.

The second uplink signal ULS2 may have the phase difference of 180 degrees from that of the first uplink signal ULS1. That is, the second uplink signal ULS2 may have an inverse phase of the first uplink signal ULS1. The uplink signal ULS (see FIG. 2) of FIG. 2 may include the first uplink signal ULS1 and the second uplink signal ULS2.

Figure 10:
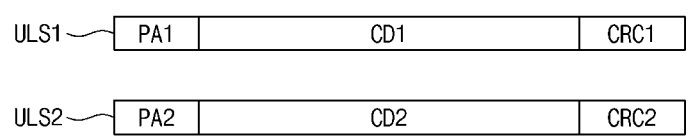
FIG. 10 schematically illustrates data of each of a first uplink signal and a second uplink signal according to some embodiments of the present disclosure.

FIG. 10 schematically illustrates data of each of a first uplink signal and a second uplink signal according to some embodiments of the present disclosure.

Referring to FIG. 10, the first uplink signal ULS1 and the second uplink signal ULS2 may have the same size as each other. For example, each of the first uplink signal ULS1 and the second uplink signal ULS2 may have a size of 33 bits.

The first uplink signal ULS1 may include first synchronization data PA1, first information data CD1, and first verification data CRC1. The second uplink signal ULS2 may include second synchronization data PA2, second information data CD2, and second verification data CRC2.

The input device 2000 (see FIG. 2) may recognize the first uplink signal ULS1 and the second uplink signal ULS2, based on the first synchronization data PA1 and the second synchronization data PA2. Each of the first synchronization data PA1 and the second synchronization data PA2 may have a size of 3 bits. The first synchronization data PA1 and the second synchronization data PA2 may be different from each other. For example, the first synchronization data PA1 may have data of 001, and the second synchronization data PA2 may have data of 110. However, the above description is an example. For example, the first synchronization data PA1 and the second synchronization data PA2 according to some embodiments of the present disclosure may be different according to a communication protocol. For example, the first synchronization data PA1 may be 101, and the second synchronization data PA2 may be 010.

Each of the first information data CD1 and the second information data CD2 may have a size of 25 bits. Each of the first information data CD1 and the second information data CD2 may include information of the electronic device 1000 (see FIG. 2).

Each of the first verification data CRC1 and the second verification data CRC2 may have a size of 5 bits. Each of the first verification data CRC1 and the second verification data CRC2 may include verification information. The verification information may detect the error of the transmitted data. The verification information may be a cyclical redundancy check (CRC).

Figure 11:
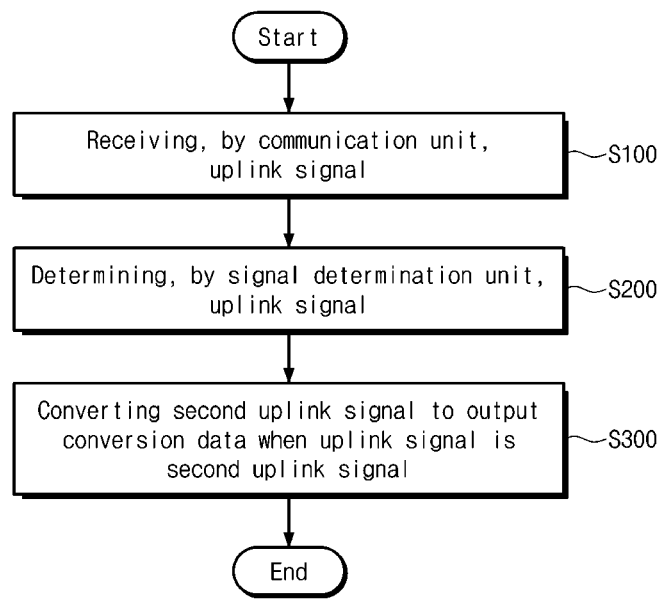
FIG. 11 is a flowchart illustrating a method of driving an input device according to some embodiments of the present disclosure.
Figure 12:
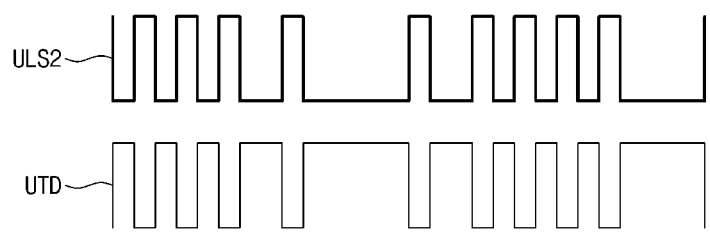
FIG. 12 illustrates waveforms of data and conversion data of a second uplink signal according to some embodiments of the present disclosure.

FIG. 11 is a flowchart illustrating a method of driving an input device according to some embodiments of the present disclosure. FIG. 12 illustrates waveforms of data and conversion data of a second uplink signal according to some embodiments of the present disclosure.

Referring to FIGS. 2 and 9 to 12, the communication unit 2700 may receive an uplink signal ULS from the sensor layer 200 (S100).

The memory 2300 may store first information of the first uplink signal ULS1 and second information of the second uplink signal ULS2. The first information may be stored based on the first synchronization data PA1. For example, the first information may include data of 001. The second information may be stored based on the second synchronization data PA2. For example, the second information may include data of 110.

The signal determination unit 2400 may determine whether the uplink signal ULS is the first uplink signal ULS1 or the second uplink signal ULS2, based on the first information and the second information (S200).

When the uplink signal ULS is the second uplink signal ULS2, the signal conversion unit 2500 may convert the second uplink signal ULS2 to output conversion data UTD (S300). The signal conversion unit 2500 may convert a first bit of the second uplink signal ULS2 into a second bit different from the first bit, and may convert the second bit into the first bit to output the conversion data UTD. The first bit may be 0 bit, and the second bit may be 1 bit. The conversion data UTD may have a phase difference of 180 degrees from that of the second uplink signal ULS2. That is, the conversion data UTD may have an inverse phase of the second uplink signal ULS2.

The second uplink signal ULS2 may have a phase different from that of the first uplink signal ULS1 (see FIG. 9), and the conversion data UTD obtained by converting the second uplink signal ULS2 may have the same phase as the first uplink signal ULS1 (see FIG. 9).

According to some embodiments of the present disclosure, the signal determination unit 2400 may distinguish the uplink signal ULS based on the first information and the second information stored in the memory 2300. That is, even though the input device 2000 does not receive a separate signal for distinguishing the uplink signal ULS from the electronic device 1000, the input device 2000 may distinguish whether the uplink signal ULS is the first uplink signal ULS1 or the second uplink signal ULS2. Accordingly, it is possible to reduce the amount of information transmitted from the electronic device 1000 to the input device 2000.

Figure 13A:
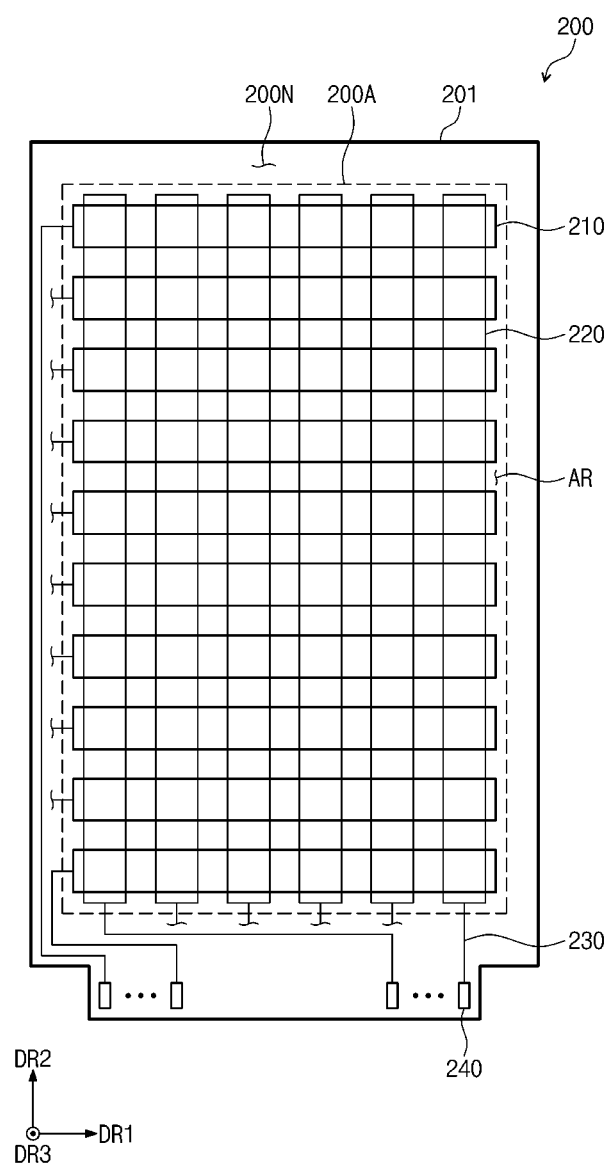
FIG. 13A is a plan view illustrating a sensor layer according to some embodiments of the present disclosure.
Figure 13B:
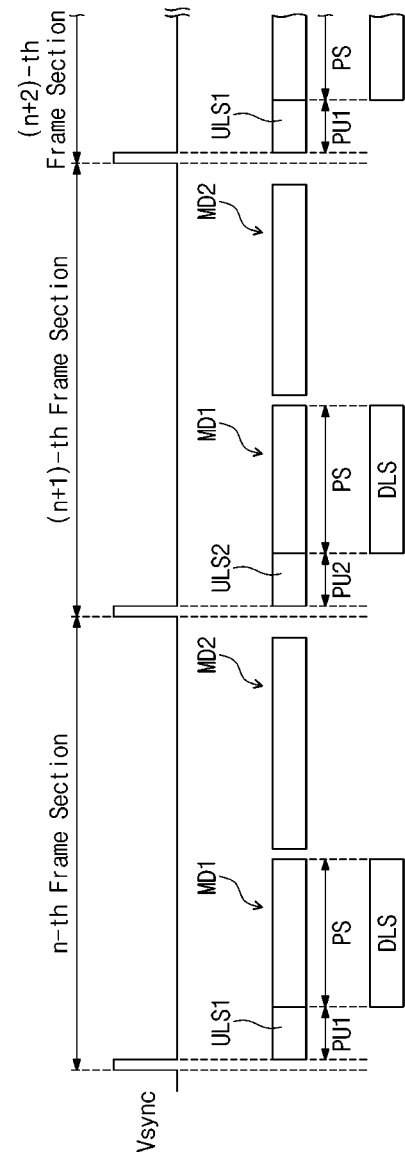
FIG. 13B is a conceptual diagram illustrating operations of a display layer and a sensor layer according to some embodiments of the present disclosure.

FIG. 13A is a plan view illustrating a sensor layer according to some embodiments of the present disclosure. FIG. 13B is a conceptual diagram illustrating operations of a display layer and a sensor layer according to some embodiments of the present disclosure.

Referring to FIGS. 2, 13A, and 13B, the sensor layer 200 may include the base insulating layer 201, the plurality of electrodes 210, the plurality of cross electrodes 220, a plurality of wires 230, and a plurality of pads 240.

The plurality of electrodes 210 and the plurality of cross electrodes 220 may be located in the active area 200A. The plurality of wires 230 and the plurality of pads 240 may be located in the peripheral area 200N.

Each of the plurality of electrodes 210 and the plurality of cross electrodes 220 may be electrically connected to the corresponding wire among the plurality of wires 230. For example, FIG. 13A illustrates a single routing structure in which the single wire 230 is connected to the single electrode 210 and the single wire 230 is connected to the single cross electrode 220. However, the embodiments according to the present disclosure are not particularly limited thereto. For example, the two wires 230 may be connected to each of the plurality of cross electrodes 220. Alternatively, the two wires 230 may be also connected to each of the plurality of electrodes 210, and the two wires 230 may be connected to each of the plurality of cross electrodes 220.

The plurality of pads 240 may be electrically connected to the plurality of wires 230, respectively. The sensor layer 200 may be electrically connected to the controller 200C through the plurality of pads 240. However, the above description is an example. For example, the plurality of pads 240 according to some embodiments of the present disclosure may be located on the display layer 100. In this case, the plurality of wires 230 may be electrically connected to the plurality of pads 240 through contact holes.

A signal area AR may be defined in the sensor layer 200. When viewed from above a plane, the signal area AR may overlap with the active area 200A (see FIG. 6).

The controller 200C may generate the first uplink signal ULS1 and the second uplink signal ULS2.

The display layer 100 may display an image in units of one frame section. One frame section may be defined as a section from the rising edge of the vertical synchronization signal Vsync to the next rising edge thereof.

When the operating frequency of the display layer 100 is 60 Hertz (Hz), the time corresponding to one frame section may be about 16.44 millisecond (ms); when the operating frequency of the display layer 100 is 120 Hz, the time corresponding to one frame section may be about 8.33 ms. In FIG. 13B, the operating frequency of the display layer 100 is illustrated as being 60 Hz, but embodiments according to the present disclosure are not limited thereto.

The sensor layer 200 may operate in a first mode MD1 for detecting a first input by the input device 2000 or a second mode MD2 for detecting a second input by a user's body 3000. While an image of one frame section is displayed on the display layer 100, the controller 200C may sequentially operate in the first mode MD1 and the second mode MD2.

During the n-th frame section ('n' is a positive integer), the sensor layer 200 may operate in the first mode MD1 and the second mode MD2. The n-th frame section may be referred to as an "odd-numbered frame section". The n-th frame section may be referred to as the first frame section.

The first mode MD1 may include a first section PU1 and a second section PS. The second section PS may proceed after the first section PU1. The controller 200C may determine the starting point of the first section PU1 in synchronization with the vertical synchronization signal Vsync. The starting point of the first section PU1 may be determined based on the level change time point of the vertical synchronization signal Vsync. For example, the starting point of the first section PU1 may be defined as a time point at which the vertical synchronization signal Vsync is changed from a high level to a low level.

In the first section PU1, the controller 200C may output the first uplink signal ULS1 to the sensor layer 200. The frame section in which the first uplink signal ULS1 is provided may be referred to as a "first frame section".

The input device 2000 may output the downlink signal DLS based on the first uplink signal ULS1. The input device 2000 may provide the downlink signal DLS to the controller 200C during the second section PS.

In the second section PS, the sensor layer 200 may receive the downlink signal DLS provided from the input device 2000. The sensor layer 200 may detect the first input of the input device 2000 based on the downlink signal DLS.

The second mode MD2 may operate after the first mode MD1.

During the (n+1)-th frame section, the sensor layer 200 may operate in the first mode MD1 and the second mode MD2. The (n+1)-th frame section may be referred to as an "even-numbered frame section". The (n+1)-th frame section may be referred to as a second frame section.

The first mode MD1 may include a first section PU2 and a second section PS. The second section PS may proceed after the first section PU2. The controller 200C may determine the starting point of the first section PU2 in synchronization with the vertical synchronization signal Vsync. The starting point of the first section PU2 may be determined based on the level change time point of the vertical synchronization signal Vsync. For example, the starting point of the first section PU2 may be defined as a time point at which the vertical synchronization signal Vsync is changed from a high level to a low level.

In the first section PU2, the controller 200C may output the second uplink signal ULS2 to the sensor layer 200. The second uplink signal ULS2 may have a phase different from that of the first uplink signal ULS1.

The input device 2000 may output the conversion data UTD (see FIG. 12) based on the second uplink signal ULS2. The input device 2000 may output the downlink signal DLS based on conversion data UTD (see FIG. 12). The input device 2000 may provide the downlink signal DLS to the controller 200C during the second section PS.

In the second section PS, the sensor layer 200 may receive the downlink signal DLS provided from the input device 2000. The sensor layer 200 may detect the first input of the input device 2000 based on the downlink signal DLS.

The first frame section and the second frame section may be repeated. That is, during the (n+2)-th frame section, the controller 200C may output the first uplink signal ULS1 to the sensor layer 200 in the first mode MD1.

The first mode MD1 and the second mode MD2 may be repeated alternatively. In the (2a-1)-th first mode MD1 ('a' is a positive integer), the controller 200C may output the first uplink signal ULS1 to the sensor layer 200. In the 2a-th first mode MD1, the controller 200C may output the second uplink signal ULS2 to the sensor layer 200.

The first uplink signal ULS1 provided in the signal area AR may be delivered to the second electrode CE (see FIG. 4) by parasitic capacitance Cb (see FIG. 4) formed between the sensor layer 200 and the second electrode CE (see FIG. 4). The first uplink signal ULS1 delivered to the second electrode CE (see FIG. 4) may be delivered to each of the plurality of data wires DL1 to DLm (see FIG. 5). Accordingly, the first noise may occur due to the first uplink signal ULS1. The first noise and the data signal DS (see FIG. 5)

collide (interfere) with each other, and thus the first flicker may occur. However, according to some embodiments of the present disclosure, the phase of the second uplink signal ULS2 and the phase of the first uplink signal ULS1, which are provided to the signal area AR, may be opposite to each other. The second uplink signal ULS2 may be delivered to the second electrode CE (see FIG. 4) by the parasitic capacitance Cb (see FIG. 4). The second uplink signal ULS2 delivered to the second electrode CE (see FIG. 4) may be delivered to each of the plurality of data wires DL1 to DLm (see FIG. 5). The second noise may occur due to the second uplink signal ULS2. The second noise and the data signal DS (see FIG. 5) collide (interfere) with each other, and thus the second flicker may occur. The first flicker and the second flicker may cause a visual illusion to cancel each other while being repeated during a plurality of frame sections. Accordingly, the image quality of the display layer 100 may be improved.

Furthermore, according to some embodiments of the present disclosure, when the signal determination unit 2400 recognizes the second uplink signal ULS2, the signal conversion unit 2500 may convert the second uplink signal ULS2 to output the conversion data UTD (see FIG. 12). The conversion data UTD (see FIG. 12) may be a signal capable of being interpreted by the input device 2000. The input device 2000 may output the downlink signal DLS based on the first uplink signal ULS1 or the conversion data UTD (see FIG. 12). The electronic device 1000 may detect the coordinates or slope of the input device 2000 based on the downlink signal DLS received from the input device 2000. Accordingly, the input device 2000 may receive the first uplink signal ULS1 or the second uplink signal ULS2, which are received from each of a plurality of frame sections, and may output the downlink signal DLS to the sensor layer 200. Accordingly, the detection reliability of the sensor layer 200 may be improved.

Figure 14:
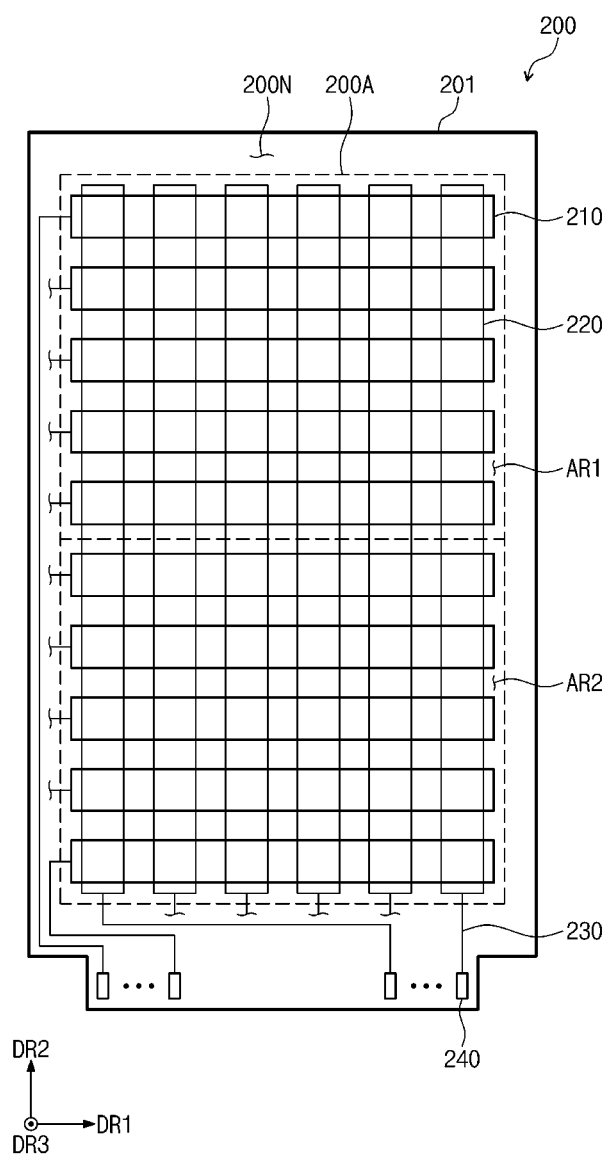
FIG. 14 is a plan view illustrating a sensor layer according to some embodiments of the present disclosure.

FIG. 14 is a plan view illustrating a sensor layer according to some embodiments of the present disclosure. In the description of FIG. 14, the same reference numerals are assigned to the same components described through FIG. 13A, and the descriptions thereof are omitted.

Referring to FIGS. 2 and 14, a first area AR1 and a second area AR2 may be defined in the sensor layer 200. The second area AR2 may be adjacent to the first area AR1. Each of the first area AR1 and the second area AR2 may be a partial area of the active area 200A (see FIG. 6). The second area AR2 may not overlap with the first area AR1. One of the first uplink signal ULS1 and the second uplink signal ULS2 may be provided to the first area AR1. The other one of the first uplink signal ULS1 and the second uplink signal ULS2 may be provided to the second area AR2.

The first uplink signal ULS1 and the second uplink signal ULS2 may be transmitted through each of the plurality of electrodes 210. Each of the first area AR1 and the second area AR2 may be defined based on the plurality of electrodes 210. However, the above description is an example. For example, the criterion by which a plurality of areas are defined is not limited thereto. For example, the first uplink signal ULS1 and the second uplink signal ULS2 may be transmitted through each of the plurality of cross electrodes 220. In this case, the first area AR1 and the second area AR2 may be defined based on each of the plurality of cross electrodes 220. Moreover, the first uplink signal ULS1 and the second uplink signal ULS2 may be transmitted through the plurality of electrodes 210 and the plurality of cross electrodes 220. In this case, the first area AR1 and the second area AR2 may be defined based on the plurality of electrodes 210 and the plurality of cross electrodes 220.

The first uplink signal ULS1 and the second uplink signal ULS2 may be delivered to the second electrode CE (see FIG. 4) by the parasitic capacitance Cb (see FIG. 4) formed between the sensor layer 200 and the second electrode CE (see FIG. 4). The first uplink signal ULS1 and the second uplink signal ULS2, which are delivered to the second electrode CE (see FIG. 4) commonly located in a plurality of pixels PX (see FIG. 5) in an integral shape, may be canceled out with each other.

According to some embodiments of the present disclosure, the first uplink signal ULS1 and the second uplink signal ULS2 delivered to the second electrode CE (see FIG. 4) may be canceled out with each other, thereby preventing the uplink signal ULS from being delivered to the plurality of data wires DL1 to DLm (see FIG. 5). The data signal DS (see FIG. 5) and the uplink signal ULS, which are provided to each of the plurality of data wires DL1 to DLm (see FIG. 5) may be prevented from colliding (or interfering) with each other, and the data signal DS (see FIG. 5) may be prevented from being modified. Accordingly, a flicker phenomenon that occurs when the data signal DS (see FIG. 5) is modified by the uplink signal ULS is removed or reduced, and thus image quality may be improved.

Furthermore, according to some embodiments of the present disclosure, when the signal determination unit 2400 recognizes the second uplink signal ULS2, the signal conversion unit 2500 may convert the second uplink signal ULS2 to output the conversion data UTD (see FIG. 12). The conversion data UTD (see FIG. 12) may be a signal capable of being interpreted by the input device 2000. The input device 2000 may output the downlink signal DLS based on the first uplink signal ULS1 or the conversion data UTD (see FIG. 12). The electronic device 1000 may detect the coordinates or slope of the input device 2000 based on the downlink signal DLS received from the input device 2000. Accordingly, the input device 2000 may respectively receive the first uplink signal ULS1 or the second uplink signal ULS2 at the first area AR1 and the second area AR2, and then may output the downlink signal DLS to the sensor layer 200. Accordingly, the detection reliability of the sensor layer 200 may be improved.

Figure 15A:
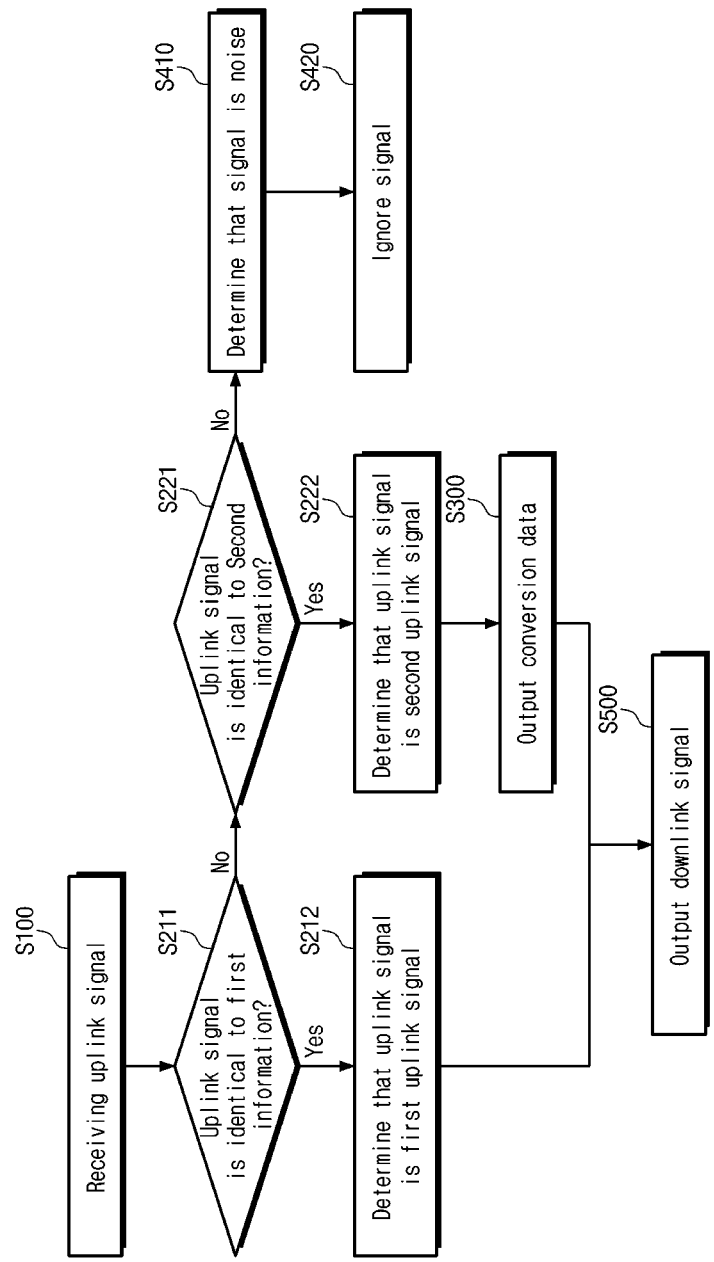
FIG. 15A is a flowchart illustrating a method of driving an input device according to some embodiments of the present disclosure.

FIG. 15A is a flowchart illustrating a method of driving an input device according to some embodiments of the present disclosure. In the description of FIG. 15A, the same reference numerals are assigned to the same components described through FIG. 11, and the descriptions thereof are omitted.

Referring to FIGS. 2 and 15A, the input device 2000 may receive the uplink signal ULS (S100). The memory 2300 may store first information of the first uplink signal ULS1 and second information of the second uplink signal ULS2.

The first information may be stored based on the first synchronization data PA1 (see FIG. 9). The second information may be stored based on the second synchronization data PA2 (see FIG. 9). However, the above description is an example. For example, the first information and the second information stored in the memory 2300 are not limited thereto. For example, the first information may be stored based on the first information data CD1 (see FIG. 9), and the second information may be stored based on the second information data CD2 (see FIG. 9).

The signal determination unit 2400 may determine whether the uplink signal ULS is the first uplink signal ULS1 or the second uplink signal ULS2, based on the first information and the second information.

When receiving the uplink signal ULS, the signal determination unit 2400 may compare the first information with the uplink signal ULS (S211). The first information may be stored based on the first synchronization data PA1 (see FIG. 9). For example, the first information may include data of 001. When the synchronization data of the uplink signal ULS includes data of the first information, the signal determination unit 2400 may determine that the uplink signal ULS is the first uplink signal ULS1 (S212). However, the above description is an example. For example, the first information according to some embodiments of the present disclosure may be stored based on the first information data CD1 (see FIG. 9). When the information data of the uplink signal ULS includes data of the first information, the signal determination unit 2400 may also determine that the uplink signal ULS is the first uplink signal ULS1.

When the synchronization data of the uplink signal ULS does not include data of the first information, the signal determination unit 2400 may compare the uplink signal ULS with the second information (S221). The second information may be stored based on the second synchronization data PA2 (see FIG. 9). For example, the second information may include data of 110. When the synchronization data of the uplink signal ULS includes data of 110, the signal determination unit 2400 may determine that the uplink signal ULS is the second uplink signal ULS2 (S222). However, the above description is an example. For example, the second information according to some embodiments of the present disclosure may be stored based on the second information data CD2 (see FIG. 9). When the information data of the uplink signal ULS includes data of the second information, the signal determination unit 2400 may determine that the uplink signal ULS is the second uplink signal ULS2.

The signal conversion unit 2500 may convert the second uplink signal ULS2 to output the conversion data UTD (see FIG. 12) (S300).

When the synchronization data of the uplink signal ULS does not include each data of the first information or the second information, the noise determination unit 2600 may determine that the uplink signal ULS is a noise signal (S410). When determining that the uplink signal ULS is the noise signal, the noise determination unit 2600 may ignore the noise signal (S420).

The transmission circuit 2710 of the communication unit 2700 may output the downlink signal DLS based on the first uplink signal ULS1 or the conversion data UTD (see FIG. 12) (S500).

According to some embodiments of the present disclosure, the input device 2000 may include the signal conversion unit 2500. When the signal conversion unit 2500 receives the second uplink signal ULS2, the transmission circuit 2710 may convert the second uplink signal ULS2 into the conversion data UTD (see FIG. 12) capable of being interpreted by the transmission circuit 2710. The transmission circuit 2710 may output the downlink signal DLS based on the first uplink signal ULS1 or the conversion data UTD (see FIG. 12). The electronic device 1000 may detect the coordinates or slope of the input device 2000 based on the downlink signal DLS received from the input device 2000. The input device 2000 may output the downlink signal DLS to the electronic device 1000 regardless of the first uplink signal ULS1 and the second uplink signal ULS2, which are output from the electronic device 1000. Accordingly, the detection reliability of the sensor layer 200 may be improved.

Furthermore, according to some embodiments of the present disclosure, the electronic device 1000 may output, to the input device 2000, the first uplink signal ULS1 and the second uplink signal ULS2 having a phase different from that of the first uplink signal ULS1. The flicker of the display layer 100 caused by the first uplink signal ULS1 may be removed or reduced by the second uplink signal ULS2. Accordingly, the image quality of the display layer 100 may be improved. When receiving the first uplink signal ULS1, the input device 2000 may output the downlink signal DLS based on the first uplink signal ULS1. When receiving the second uplink signal ULS2, the input device 2000 may convert the second uplink signal ULS2 to output the conversion data UTD (see FIG. 12) and may output the downlink signal DLS based on the conversion data UTD (see FIG. 12). The conversion data UTD (see FIG. 12) may be substantially the same as the first uplink signal ULS1. Even when receiving the second uplink signal ULS2 as well as the first uplink signal ULS1, the input device 2000 may output the downlink signal DLS to the sensor layer 200. The input device 2000 may recognize the second uplink signal ULS2 for improving image quality as the valid uplink signal ULS. That is, the input device 2000 and the electronic device 1000 may be synchronized with each other not only by the first uplink signal ULS1 but also by the second uplink signal ULS2. Accordingly, detection sensitivity of the sensor layer 200 may be improved.

Figure 15B:
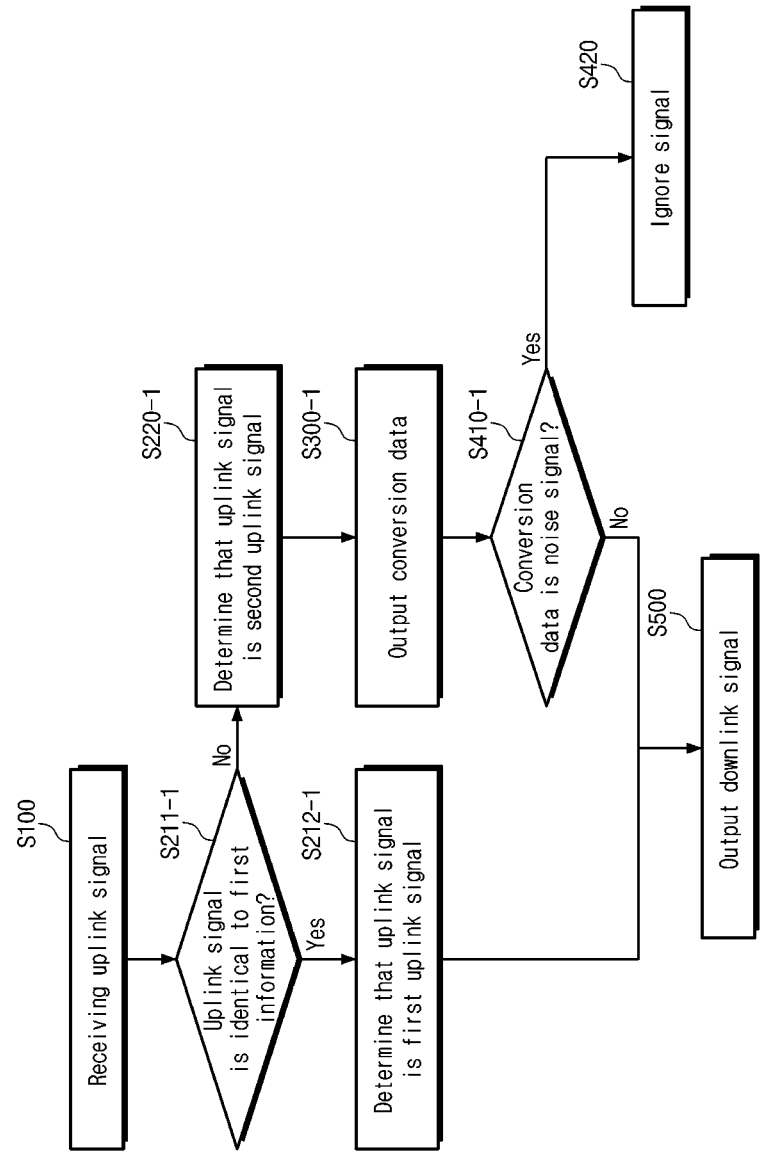
FIG. 15B is a flowchart illustrating a method of driving an input device according to some embodiments of the present disclosure.

FIG. 15B is a flowchart illustrating a method of driving an input device according to some embodiments of the present disclosure. In the description of FIG. 15B, the same reference numerals are assigned to the same components described through FIG. 11, and the descriptions thereof are omitted.

Referring to FIGS. 2 and 15B, the input device 2000 may receive the uplink signal ULS (S100). The memory 2300 may store first information of the first uplink signal ULS1 and second information of the second uplink signal ULS2.

The first information may be stored based on the first synchronization data PA1 (see FIG. 9). The second information may be stored based on the second synchronization data PA2 (see FIG. 9).

The signal determination unit 2400 may determine whether the uplink signal ULS is the first uplink signal ULS1, based on the first information.

When receiving the uplink signal ULS, the signal determination unit 2400 may compare the first information with the uplink signal ULS (S211-1). The first information may be stored based on the first synchronization data PA1 (see FIG. 9). For example, the first information may include data of 001. When the synchronization data of the uplink signal ULS includes data of the first information, the signal determination unit 2400 may determine that the uplink signal ULS is the first uplink signal ULS1 (S212-1).

When the synchronization data of the uplink signal ULS does not include data of the first information, the signal determination unit 2400 may determine that the uplink signal ULS is the second uplink signal ULS2 (S220-1).

The signal conversion unit 2500 may convert the second uplink signal ULS2 to output the conversion data UTD (see FIG. 12) (S300-1).

The noise determination unit 2600 may determine whether the conversion data UTD (see FIG. 12) is a noise signal (S410-1). When the conversion data UTD (see FIG. 12) does not include data of the first information, the noise determination unit 2600 may determine that the conversion data UTD (see FIG. 12) is a noise signal. When determining that conversion data UTD (see FIG. 12) is the noise signal, the noise determination unit 2600 may ignore the noise signal (S420).

The transmission circuit 2710 of the communication unit 2700 may output the downlink signal DLS based on the first uplink signal ULS1 or the conversion data UTD (see FIG. 12) (S500).

According to some embodiments of the present disclosure, the input device 2000 may include the signal conversion unit 2500. When receiving a signal other than the first uplink signal ULS1, the signal conversion unit 2500 may convert the signal into the conversion data UTD (see FIG. 12). The transmission circuit 2710 may output the downlink signal DLS based on the first uplink signal ULS1 or the conversion data UTD (see FIG. 12). The electronic device 1000 may detect the coordinates or slope of the input device 2000 based on the downlink signal DLS received from the input device 2000. The input device 2000 may output the downlink signal DLS to the electronic device 1000 regardless of the first uplink signal ULS1 and the second uplink signal ULS2, which are output from the electronic device 1000. Accordingly, the detection reliability of the sensor layer 200 may be improved.

Although described above with reference to some example embodiments of the present disclosure, it will be understood by those skilled in the art that various modifications and changes may be made in the present disclosure without departing from the spirit and scope of the present disclosure as set forth in the claims, and their equivalents, below. Accordingly, the technical scope of embodiments according to the present disclosure should not be limited to the contents described in the detailed description of the specification but should be defined by the claims.

According to some embodiments of the present disclosure, an electronic device may output, to an input device, a first uplink signal and a second uplink signal having a phase different from that of the first uplink signal. As the electronic device outputs uplink signals having different phases from each other, the flicker of a display layer caused by the uplink signal may be eliminated or reduced. The image quality of the display layer may be relatively improved.

Additionally, according to some embodiments of the present disclosure, the input device may include a signal determination unit and a signal conversion unit. When the signal determination unit recognizes the second uplink signal, the signal conversion unit may convert the second uplink signal to output the conversion data. The conversion data may refer to a signal capable of being interpreted by the input device. The input device may output a downlink signal based on the first uplink signal and the conversion data. The electronic device may detect the coordinates or slope of the input device based on the downlink signal received from the input device. Accordingly, the detection reliability of a sensor layer may be improved.

While aspects of some embodiments according to the present disclosure have been described with reference to some embodiments thereof, it will be apparent to those of ordinary skill in the art that various changes and modifications may be made thereto without departing from the spirit and scope of the present disclosure as set forth in the following claims, and their equivalents.

What is claimed is:

1. An interface device comprising:
   an electronic device; and
   an input device configured to communicate with the electronic device,
   wherein the electronic device includes:
   a display layer;
   a sensor layer on the display layer and configured to detect a first input by the input device; and
   a controller configured to output a first uplink and a second uplink signal having a phase different from a phase of the first uplink signal to the sensor layer, and
   wherein the input device includes:
   a communication unit configured to receive an uplink signal from the sensor layer;
   a memory configured to store first information of the first uplink signal and second information of the second uplink signal;
   a signal determination unit configured to determine whether the uplink signal is the first uplink signal or the second uplink signal, based on the first information and the second information; and
   a signal conversion unit configured to output conversion data by converting the second uplink signal in response to the uplink signal being the second uplink signal, wherein the conversion data has a same frequency and a same phase as the first uplink signal, and the conversion data has an opposite phase to the phase of the second uplink signal.

2. The interface device of claim 1, wherein the first uplink signal includes first synchronization data, first information data, and first verification data, and
   wherein the second uplink signal includes second synchronization data, second information data, and second verification data.

3. The interface device of claim 2, wherein the signal determination unit is configured to distinguish the first uplink signal and the second uplink signal based on the first synchronization data or the second synchronization data, the first information stored in the memory, and the second information stored in the memory.

4. The interface device of claim 2, wherein the signal determination unit is configured to distinguish the first uplink signal and the second uplink signal based on the first information data or the second information data, the first information stored in the memory, and the second information stored in the memory.

5. The interface device of claim 1, wherein the signal conversion unit is configured to convert a first bit of the second uplink signal into a second bit of conversion data, the second bit being different from the first bit, and to convert a second bit of the second uplink signal into a first bit of conversion data to output the conversion data.

6. The interface device of claim 5, wherein the input device is configured to output a downlink signal based on the conversion data or the first uplink signal.

7. The interface device of claim 1, wherein the display layer displays an image during a plurality of frame sections, and
   wherein the controller is configured to output the first uplink signal to the sensor layer during a n-th frame section ('n' is a positive integer), and the controller is configured to output the second uplink signal to the sensor layer during a (n+1)-th frame section.

8. The interface device of claim 1, wherein a first area and a second area adjacent to the first area are defined on the sensor layer, and
   wherein the controller is configured to output the first uplink signal to the first area and to output the second uplink signal to the second area.

9. The interface device of claim 1, wherein the electronic device further includes a display driver configured to generate a vertical synchronization signal for driving the display layer; and wherein the controller is configured to output the first uplink signal or the second uplink signal to the sensor layer in synchronization with the vertical synchronization signal.

10. The interface device of claim 1, wherein the sensor layer is configured to operate in a first mode for detecting the first input and a second mode for detecting a second input by a touch, and
wherein the controller is configured to sequentially operate in the first mode and the second mode while an image during a single frame section is displayed on the display layer.

11. The interface device of claim 1, wherein the input device further includes a noise determination unit configured to determine a noise signal different from the first uplink signal and the second uplink signal.

12. The interface device of claim 11, wherein the noise determination unit is configured to ignore the noise signal in response to the noise determination unit determining that the uplink signal is the noise signal.

13. A method of driving an input device, the method comprising:
receiving an uplink signal;
determining whether the uplink signal is a first uplink signal or a second uplink signal having a phase different from a phase of the first uplink signal; and
in response to the uplink signal being the second uplink signal, outputting conversion data by converting the second uplink signal, wherein the conversion data has a same frequency and a same phase as the first uplink signal, and the conversion data has an opposite phase to the phase of the second uplink signal.

14. The method of claim 13, wherein the first uplink signal includes first synchronization data, first information data, and first verification data,
wherein the second uplink signal includes second synchronization data, second information data, and second verification data, and
wherein the determining of whether the uplink signal is the first uplink signal or the second uplink signal includes:
distinguishing the first uplink signal and the second uplink signal based on the first synchronization data and the second synchronization data.

15. The method of claim 13, wherein the converting of the second uplink signal includes:
converting a first bit of the second uplink signal into a second bit of conversion data, the second bit being different from the first bit, and converting a second bit of the second uplink signal into a first bit of conversion data to output the conversion data.

16. The method of claim 15, further comprising:
outputting a downlink signal based on the conversion data or the first uplink signal.

17. The method of claim 13, wherein the first uplink signal includes first synchronization data, first information data, and first verification data,
wherein the second uplink signal includes second synchronization data, second information data, and second verification data, and
wherein the determining of whether the uplink signal is the first uplink signal or the second uplink signal includes:
distinguishing the first uplink signal and the second uplink signal based on the first information data and the second information data.

18. The method of claim 13, further comprising:
further determining a noise signal different from the first uplink signal and the second uplink signal; and
ignoring the noise signal in response to the input device receiving the noise signal.

19. The method of claim 18, wherein the determining of the noise signal proceeds simultaneously with the determining of whether the uplink signal is the first uplink signal or the second uplink signal.

20. The method of claim 18, wherein the determining of the noise signal occurs after the converting of the second uplink signal.

* * * * *